Patented Jan. 1, 1929.

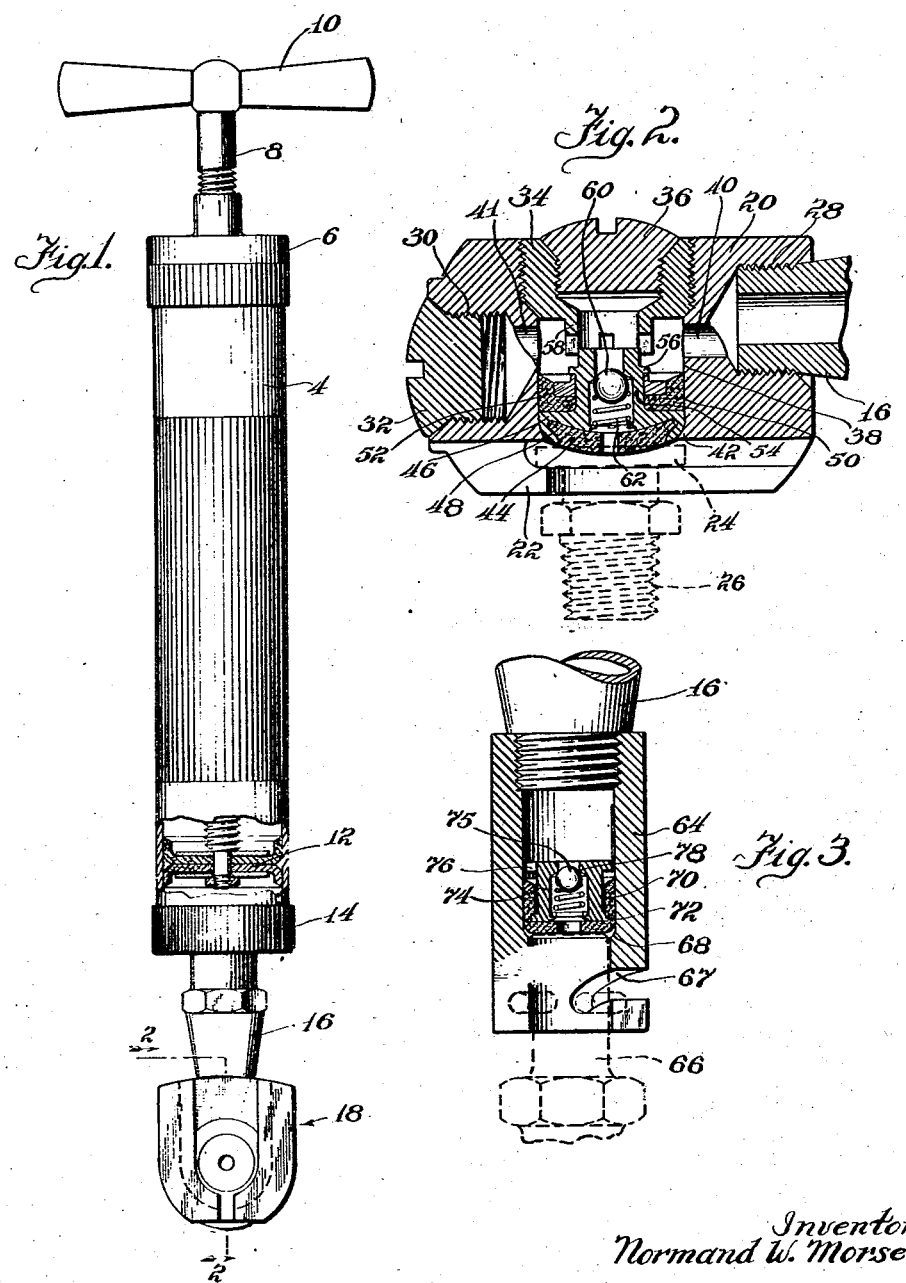

1,697,324

UNITED STATES PATENT OFFICE.

NORMAND W. MORSE, OF CHICAGO, ILLINOIS, ASSIGNOR TO ALEMITE MANUFACTURING CORPORATION, OF CHICAGO, ILLINOIS, A CORPORATION OF DELAWARE.

LUBRICATING APPARATUS.

Application filed April 28, 1927. Serial No. 187,174.

My invention relates to lubricating apparatus, and is especially concerned with improvements in the couplings used in lubricating systems of that type in which the bearings of a machine to be lubricated are each provided with a lubricant receiving member or nipple, to which lubricant may be supplied under pressure by a lubricant pump or compressor, having a discharge port provided with a coupling member adapted to be detachably connected to the nipples.

In a type of coupling which is well known in the art and is used with what are termed "button-head" lubricant receiving nipples, some difficulty has been experienced in providing a suitable lubricant seal for the connection between the coupling member and the fitting. It has been customary to provide a spring to press the lubricant sealing member against the head of the nipple to make the initial contact therewith, and then to rely upon the subsequent pressure of the lubricant firmly to press the sealing member against the end of the fitting. In this type of coupling the sealing member is normally held by this spring in a position slightly protruding from the coupling, so that the spring may be effective to make the initial seal. Thus when attaching the coupling member to a fitting, the transverse movement of the end of the fitting past the sealing member would tend to roughen the outer surface of the sealing member and thus decrease its efficacy as a seal.

It is an object of my invention to overcome this disadvantage of the couplings of the prior art by providing a coupling in which the sealing member is adapted to be pressed against the end of the fitting only by the pressure of the lubricant, and is adapted to be retracted from sealing contact with the end of the fitting by the suction produced when relieving the pressure in the compressor.

A further object is to provide a simplified form of coupling in which the parts may quickly and easily be assembled, which is simple in construction, and may be economically manufactured.

Other objects will appear from the following description, reference being had to the accompanying drawings, in which:

Figure 1 is an elevation of a compressor and coupling, a portion of the compressor being broken away to show its internal structure;

Figure 2 is a longitudinal sectional view taken on the line 2—2 of Figure 1; and Figure 3 is a modification of my invention showing its application to a coupler for use with what is customarily known as a "pin fitting".

As shown in Figure 1, the compressor, which is utilized with the coupling of my invention, comprises a barrel 4 having a top cap 6 which is centrally threaded to receive the piston rod 8, to the outer end of which the handle 10 is secured and to the inner end of which a cup leather piston 12 is attached. The lower end of the barrel 4 is closed by a suitable cap 14 which includes a nozzle portion 16 adapted to be threaded into a suitable coupling, designated generally as 18. This coupling comprises a body portion 20 which has undercut flanges 22 formed integrally therewith and which are adapted to slide beneath the head 24 of the "button head" lubricant receiving fitting 26, which is shown in dotted lines in Figure 2.

The body portion 20 is tapped at 28 and 30 to receive the end of the nozzle 16. By screwing in the nozzle at the threaded opening 28, the coupling may be attached to the fitting by pulling on the compressor, whereas if the nozzle is attached at the threaded portion 30 the connection is made by an axial push on the compressor. The threaded opening 28 or 30 not connected to the nozzle is closed by a suitable plug 32. A guiding member 34, the functions of which will hereinafter be described in greater detail, is threaded in the body 20 in the direction perpendicular to the threaded springs 28 and 30 and is internally threaded to receive a plug 36. The nozzle may also optionally be screwed into the member 34, the plug 36 in such instance being used to close the threaded opening 28. The body 20 has a substantially cylindrical bore 37 which is connected by suitable ducts 40 and 41 with the threaded openings 28 and 30. A rounded shoulder 42 is formed adjacent the lower end of the bore 38 and serves as a limiting stop for a sealing member which is reciprocable within said bore.

The sealing member comprises an apertured diaphragm disc 44 which is held by a diaphragm retainer 46, the peripheral edges 48 of the latter being bent inwardly so as securely to clamp the diaphragm in position. A flexible cup washer 50 rests upon the retainer 46 and is secured thereto by a suitable metallic ring 52 which is pressed over the tubular portion 54 of the retainer 46, the ring being riveted in position by pressing an annular flange 56 over the ring 52. The upper end of the tubular portion 54 of the retainer is guided in a castellated annular depending flange 58 formed integrally with the member 34. This flange is cut away at suitable intervals to permit passage of lubricant to the bore of the tubular member 54. This fore is formed with a suitable shoulder forming a valve seat for the ball check valve 60 which is normally pressed against this seat by a spring 62 which rests upon suitable ears struck from the retainer 46.

The operation of this coupling device and sealing member is as follows:

The operator slides the coupling over the head of the fitting, the sealing member assembly then being in its upper position with the shoulder 56 in engagement with the depending flange 58. After the mechanical connection has been made and the lubricant compressor operated to force lubricant through the ducts 40 into the bore 38, the lubricant pressure acts upon the cup leather and forces the sealing unit downwardly to bring the sealing diaphragm in firm contact with the top surface of the head 24 of the lubricant receiving fitting. After the seal has been made and the compressor is further operated, the pressure within the bore 38 will build sufficiently to open the check valve 60 and force lubricant into the fitting.

After sufficient lubricant has been forced into the fitting the operator turns backwardly on the handle 10 of the compressor to withdraw the piston 12, thereby creating a partial vacuum within the bore 38 and permitting atmospheric pressure to force the sealing assembly upwardly until the shoulder 56 engages the depending flange 58. The sealing diaphragm 44 is thus freed from contact with the end of the fitting and the coupling can then easily be detached from the fitting and is in condition for readily being coupled with the next fitting.

In Figure 3 I have shown a modified form of my invention, in which a lubricant pressed cup washer is utilized to form a seal between a tubular coupling member 64 and the lubricant receiving nipple 66 (shown in dotted lines), which is customarily termed a pin fitting, due to the fact that a pin projects transversely through the cylindrical portion of the pin, and is adapted to make a mechanical connection with a tube which has a suitable bayonet slot formed therein. In this modification the tube 64 has suitable opposed bayonet slots 67 (only one shown) formed at its lower end, and has its lower portion of slightly smaller internal diameter to provide a shoulder 68 for limiting the downward movement of a cup leather 70, which fits around the lower flange 72 of a check valve cage 74. The cage has an upper flange 76 by which it is guided for axial reciprocation within the bore of the tube 64. An outwardly opening spring pressed ball check valve 75 is confined within the cage 74 and normally rests against a seat 78. The operation of this sealing unit is similar to that of the device shown in Figure 2. In the use of the coupling shown in Figure 3 it is ordinarily unnecessary to turn backwardly on the compressor handle sufficiently to retract the sealing member from contact with the end of the fitting since there is usually enough air entrapped in the lubricant so that the slight upward movement of the sealing member incident to the uncoupling from the fitting is possible due to the compressibility of the entrapped air.

While I have shown and described particular embodiments of my invention, it will be apparent to those skilled in the art that modifications thereof may be made without departing from the principles of my invention. I therefore wish to limit the scope of my invention only by the claims which follow.

1. High pressure lubricating apparatus of the class described comprising, in combination, a coupling element having a bore including an unobstructed portion, sealing means freely slidable in said unobstructed portion except for the frictional resistance offered by the contacting parts of said sealing means and the wall of said bore, said sealing means being moved longitudinally in said bore and into sealing engagement with a second coupling element solely by the pressure of the lubricant on the inner end of said sealing means, said sealing means having a passageway therethrough and displaceable resistance means normally closing said passageway, said resistance means being displaceable only under lubricant pressure greater than that necessary to overcome said frictional resistance.

2. A high pressure lubricant coupling comprising a coupling element having a bore including an unobstructed portion, sealing means slidable in said unobstructed portion, said sealing means having a part engaging a wall of said bore and creating a frictional resistance to movement of said sealing means in said bore, means at both ends of the unobstructed portion of said bore for limiting movement of said sealing means, said sealing means being movable outwardly in said bore and into sealing contact with a complementary coupling element solely in response to lubricant pressure on the inner end of said sealing means, said sealing means having a valved passageway therethrough, an outwardly opening valve normally closing said passageway, and a spring for maintaining said valve in closed position, said spring being under sufficient initial compression to maintain said valve in closed position under an application of lubricant pressure of a degree capable of moving said sealing means into sealing engagement with said complementary coupling element.

3. In high pressure lubricating apparatus of the class described, a female coupling element having a bore including an unobstructed portion, sealing means freely slidable in said unobstructed portion except for the frictional resistance offered by the contact between said sealing means and the wall of said bore, said sealing means being moved longitudinally in said bore and into sealing engagement with a male coupling element solely by the pressure of the lubricant on the inner end of said sealing means and retracted by the atmospheric pressure on the outer end of said sealing means upon relief of lubricant pressure in said female element, said sealing means having a passageway therethrough and displaceable resistance means normally closing said passageway, said resistance means displaceable only under lubricant pressure greater than that necessary to overcome said frictional resistance.

4. In high pressure lubricating apparatus of the class described, a female coupling element for attachment to the discharge conduit of a lubricant compressor, a male coupling element for attachment to a part to be lubricated, co-operating pin and slot means associated with said elements for effecting a quick detachable connection therebetween, said female element having a bore therein including an unobstructed portion into which an end of said male element is adapted to be inserted, sealing means freely slidable in said unobstructed portion except for the frictional resistance resulting from the contact between said sealing means and the wall of said bore, said sealing means being urged outwardly and into sealing engagement with said male element solely by the pressure of the lubricant and comprising an apertured cup-shaped flexible sealing washer having a sealing surface adapted to engage the end of said male coupling element and a second surface adapted to engage a metal valve cage associated with said sealing washer, said valve cage having a large end engageable with the wall of said bore and a second end of reduced diameter surrounded by the upturned edge of said cup leather, a ball valve in said cage and a valve spring under sufficient initial compression to maintain said valve closed until the lubricant pressure impressed on said female element is more than sufficient to overcome said frictional resistance and move said sealing means into lubricant tight engagement with said male element.

In witness whereof, I hereunto subscribe my name this 21st day of April, 1927.

NORMAND W. MORSE.